ముందుకు

2,944,051
N-HALOETHYLENIMINES

Allen F. Graefe, Pomona, Calif., assignor to Aerojet-General Corporation, Azusa, Calif., a corporation of Ohio No Drawing. Filed Jan. 3, 1955, Ser. No. 479,658

10 Claims. (Cl. 260—239)

This invention relates to new compositions of matter and a method for their preparation. In particular, it relates to N-haloethylenimines having the general formula:

wherein X is a chlorine, bromine or iodine radical.

These compounds find valuable use as starting materials for the commercial preparation of substituted hydrazines, particularly N-aminoethylenimine.

As disclosed in my copending application Serial No. 371,187, filed July 29, 1953, N-aminoethylenimine is a highly reactive rocket fuel combining the features of a strained three-membered ring and a hydrazine functional group. In addition, N-aminoethylenimine exhibits many desirable features such as a low freezing point and low vapor pressure unrealized in fuels such as hydrazine, ammonia and liquid hydrogen.

N-aminoethylenimine exhibits a high theoretical specific impulse when burned with liquid oxygen and freezes below —50° C., and has a vapor pressure of less than one atmosphere below temperatures of 100° C. The unique structure of N-aminoethylenimine, combining the features of a strained three-membered ring as well as a hydrazine function, causes the material to be a highly reactive fuel, giving it valuable properties for use as the fuel constituent of a bi-propellant rocket system. N-aminoethylenimine can be used conveniently with any strong liquid oxidizing agent such as liquid oxygen or nitric acid.

Heretofore, the preparation of N-aminoethylenimine has required the use of expensive starting materials and complicated reaction systems. In contrast, the new compositions of matter of this invention, N-haloethylenimines, readily condense with ammonia under non-critical conditions to directly produce N-aminoethylenimine. In the same manner, N-haloethylenimines can also be condensed with other amino compounds such as ethylene amine, ethylene diamine and ethanol amine to produce substituted hydrazines which also find valuable use as rocket fuels. Thus, a new and commercially practical method of manufacturing N-aminoethylenimine type fuels is provided by the use of N-haloethylenimines.

The new compositions of matter of the present invention are prepared by reacting ethylenimine with alkali or alkaline earth metal hypohalites, in accordance with the general reaction scheme set forth below:

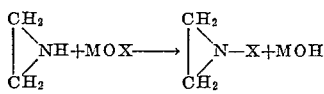

wherein M is an alkali or alkaline earth metal ion and X is a chlorine, bromine or iodine radical.

In order to more closely control the reaction, it is generally run at a temperature of about —10° C. to about +10° C. At higher temperatures, the reaction is less easily controlled, and at lower temperatures, the reaction is usually too slow for commercial use.

As a matter of convenience, it is usually preferred to conduct the reaction in the presence of a solvent such as water. If desired, the hypohalite can be produced in situ by merely adding halogen to the ethylenimine-alkali or alkaline earth metal hydroxide solution.

To more clearly illustrate my invention, the following example is presented. It should be understood, however, that this example is presented merely as a means of illustration and is not intended to limit the scope of the invention in any way.

EXAMPLE I

Preparation of N-chloroethylenimine

To 8.4 gm. (0.2 mole) of NaOH (assay 97%) dissolved in 35 ml. of water, 7.3 gm. (0.1 mole) of chlorine was added by bubbling the gas into the solution until the required amount had been absorbed. During the addition, the temperature of the solution was maintained at 0° to —5° C. To this solution, 4.3 gm. of ethylenimine, which had been cooled to 0° C., was added in one portion. The temperature was raised to +5° C. by ensuing reaction, and a colorless oil separated. The oil (top layer) was separated from the aqueous layer and dried over anhydrous sodium sulfate. It was then distilled and boiled at 70 to 70.5° C. There was no forerun and no pot residue. The product was a water-white, mobile liquid, insoluble in water, and soluble in ether and organic solvents, $n_d^{20}=1.4433$.

The following information was obtained relating to the structure and analysis of the isolated product. Analysis of the product for positive halogen was carried out by the oxidation of the iodide ion and titration of the liberated iodine with standard thiosulfate solution. Based on the formula $C_2H_4NCl$, the product analyzed 98.0%, 97.6% before distillation, and 100.0%, 99.7% after distillation. The presence of the three-membered ring was shown by an infrared spectrum of the pure product. In this connection, absorption frequencies of ethylenimine due to ring distortion have been assigned at 855 cm.$^{-1}$, and 1215 cm.$^{-1}$. The isolated compound showed adsorption bands at both of these frequencies. For comparison, the infrared spectrum of dimethylchloramine, $(CH_3)_2NCl$, was determined. This compound was also found to absorb in the region of 855 cm.$^{-1}$, but no absorption occurred at 1215 cm.$^{-1}$.

I have also found that under the conditions described in Example I sodium hypobromite will react with ethylenimine to produce N-bromoethylenimine and sodium hypoiodite will react with ethylenimine to produce N-iodoethylenimine. N-halo-1,3-propylenimine and homologous imines can be prepared in accordance with the procedure outlined above by condensing appropriate starting materials such as propylene imine, etc. However, the corresponding N-aminoalkylenimines of such compounds are not suitable as propellants or propellant fuels due to the proportionate decrease in ring strain and hydrazine hydrocarbon proportions, accompanied by a corresponding decrease in explosive and propellant properties.

It is apparent from the foregoing discussion that the new compositions of matter herein described have widespread application in the syntheses of imino type compounds having a three-membered ring and finding valuable use as rocket fuels.

I claim:

1. As new compositions of matter, N-haloethylenimines having the general formula:

wherein X is a halogen radical selected from the group consisting of chlorine, bromine and iodine radicals.

2. As a new composition of matter, N-chloroethylenimine having the structural formula:

3. As a new composition of matter, N-bromoethylenimine having the structural formula:

4. As a new composition of matter, N-iodoethylenimine having the structural formula:

5. The method of preparing N-haloethylenimines having the general formula:

wherein X is a radical selected from the group consisting of chlorine, bromine and iodine radicals; which comprises reacting ethylenimine with a hypohalite selected from the group consisting of alkali and alkaline earth metal hypochlorites, hypobromites and hypoiodites.

6. The method of claim 5 wherein the reaction is conducted at a temperature in the range of from about $-10°$ C. to about $+10°$ C.

7. The method of claim 5 wherein the hypohalite is prepared in situ by the reaction of a halogen selected from the group consisting of chlorine, bromine and iodine with a base selected from the group consisting of the alkali and alkaline earth metal hydroxides.

8. The method of preparing N-chloroethylenimine which comprises reacting ethylenimine with sodium hypochlorite.

9. The method of preparing N-bromoethylenimine which comprises reacting ethylenimine with sodium hypobromite.

10. The method of preparing N-iodoethylenimine which comprises reacting ethylenimine with sodium hypoiodite.

No references cited.